United States Patent
Thorsen et al.

(10) Patent No.: US 9,824,314 B2
(45) Date of Patent: Nov. 21, 2017

(54) GROUPING EMAIL MESSAGES INTO CONVERSATIONS

(75) Inventors: Alicia Thorsen, Sunnyvale, CA (US); Karl Hsu, Cupertino, CA (US); Simon Bovet, Palo Alto, CA (US); Neil Jhaveri, Cupertino, CA (US); Nick Woods, San Francisco, CA (US); Brendan Langoulant, San Francisco, CA (US); Jonathan Michael Deutsch, Cupertino, CA (US); Angela Guzman, San Jose, CA (US); Stephen O. Lemay, Palo Alto, CA (US); Patrick L. Coffman, San Francisco, CA (US); Stephen Decker, San Francisco, CA (US); Judy Halchin, Cupertino, CA (US)

(73) Assignee: Apple Inc., Cupertino, CA (US)

(*) Notice: Subject to any disclaimer, the term of this patent is extended or adjusted under 35 U.S.C. 154(b) by 954 days.

(21) Appl. No.: 13/007,547

(22) Filed: Jan. 14, 2011

(65) Prior Publication Data

US 2012/0185797 A1 Jul. 19, 2012

(51) Int. Cl.
G06F 3/048 (2013.01)
G06Q 10/00 (2012.01)
G06F 17/30 (2006.01)

(52) U.S. Cl.
CPC ....... *G06Q 10/00* (2013.01); *G06F 17/30601* (2013.01)

(58) Field of Classification Search
CPC ....... G06Q 10/10; G06Q 10/107; H04L 51/16
USPC ........................................................ 709/206
See application file for complete search history.

(56) References Cited

U.S. PATENT DOCUMENTS 5,806,021 A * 9/1998 Chen et al. ........................ 704/9
5,948,058 A    9/1999 Kudoh et al.
6,065,003 A * 5/2000 Sedluk
6,330,589 B1 12/2001 Kennedy (Continued)

OTHER PUBLICATIONS http:www2creo.com/sixdegrees; Six Degrees—timefreeing technology, "Six Degrees Weblog" CREO-Six Degrees, p. 1 of 1, visited on Jun. 30, 2003.
http://office.microsoft.com/assistance/preview.aspx?AssetID=H A010 . . . Microsoft Office Assistance, "Power tips for organizing your Outlook 2002 Inbox," Microsoft Office Online, pp. 1-3, visited on Feb. 5, 2004.

(Continued)

*Primary Examiner* — Claudia Dragoescu
(74) *Attorney, Agent, or Firm* — Blakely, Sokoloff, Taylor & Zafman LLP

(57) ABSTRACT

Exemplary methods, apparatuses, and systems determine that an indication that a received message was sent in response to another message is present in the received message, parse a stored message, in response to the indication being present, for at least a partial match between a subject of the received message and contents of a subject of the stored message, and for at least a partial match between sender and recipient participants of the received message and sender and recipient participants of the stored message, and display the received message as grouped with the stored message. A further exemplary feature includes parsing text of the received message for text that is redundant of text of the stored message, determining that a minimum threshold of consecutive matching characters has been reached, and displaying the received message with the consecutive matching characters at least partially hidden from view.

48 Claims, 15 Drawing Sheets

(56) References Cited

U.S. PATENT DOCUMENTS

| | | |
|---|---|---|
| 6,442,592 B1 | 8/2002 | Alumbaugh et al. |
| 6,496,853 B1 | 12/2002 | Klein |
| 6,525,747 B1 | 2/2003 | Bezos |
| 6,631,398 B1 | 10/2003 | Klein |
| 6,700,591 B1 | 3/2004 | Sharpe |
| 6,701,346 B1 | 3/2004 | Klein |
| 6,704,772 B1 | 3/2004 | Ahmed et al. |
| 6,714,971 B2 | 3/2004 | Motoyama et al. |
| 6,745,197 B2 | 6/2004 | McDonald |
| 6,807,566 B1 | 10/2004 | Bates et al. |
| 6,832,244 B1 | 12/2004 | Raghunandan |
| 7,421,690 B2 | 9/2008 | Forstall et al. |
| 7,620,407 B1 | 11/2009 | Donald et al. |
| 8,185,591 B1* | 5/2012 | Lewis .................... 709/206 |
| 2002/0073117 A1 | 6/2002 | Newman |
| 2002/0073157 A1 | 6/2002 | Newman et al. |
| 2002/0080180 A1* | 6/2002 | Mander et al. ............... 345/769 |
| 2003/0163537 A1 | 8/2003 | Rohall et al. |
| 2003/0167310 A1 | 9/2003 | Moody et al. |
| 2004/0044735 A1 | 3/2004 | Hoblit |
| 2005/0005246 A1* | 1/2005 | Card et al. ................... 715/776 |
| 2005/0223057 A1* | 10/2005 | Buchheit et al. ............. 709/203 |
| 2006/0271630 A1* | 11/2006 | Bensky et al. ................ 709/206 |

OTHER PUBLICATIONS

Venolia, Gina Danielle et al., "Understanding Sequence and Reply Relationships with Email Conversations: A Mixed-Model Visualization," ACM, Apr. 10, 2003, 8 pages.
Kerr, Bernard, "Thread ARCS: An Email Thread Visualization," IEEE, Oct. 21, 2003, pp. 211-218.
Lewis, David D. et al, "Threading Electronic Mail: A Preliminary Study," AT&T Labs, 1997, 15 pages.
Smith, Marc A. et al, "Visualization Components for Persistent Conversations," Microsoft Research, Microsoft Corporation, Sep. 21, 2000, 9 pages.
Fisher, Danyel et al., "Studies of Automated Collection of Email Records," Technical Report UCI-ISR-02-4, 2002, 10 pages.
Rohall, Steven L. et al., "Email Visualization to Aid Communications," IEEE, 2001, 4 pages.
Sudarsky, Sandra et al., "Visualizing Electronic Mail," Siemens Corporate Research, Inc., IEEE, 2002, 7 pages.
Erera, Shai, et al., "Conversation Detection in Email Systems," Springer-Verlag Berlin Heidelberg, 2008, pp. 498-505.
Yeh, Jen-Yuan et al., "Email Thread Reassembly Using Similarity Matching," CEAS 2006—Third Conference on Email and Anti-Spam, Jul. 27-28, 2006, Mountain View, California USA, 8 pages.

* cited by examiner

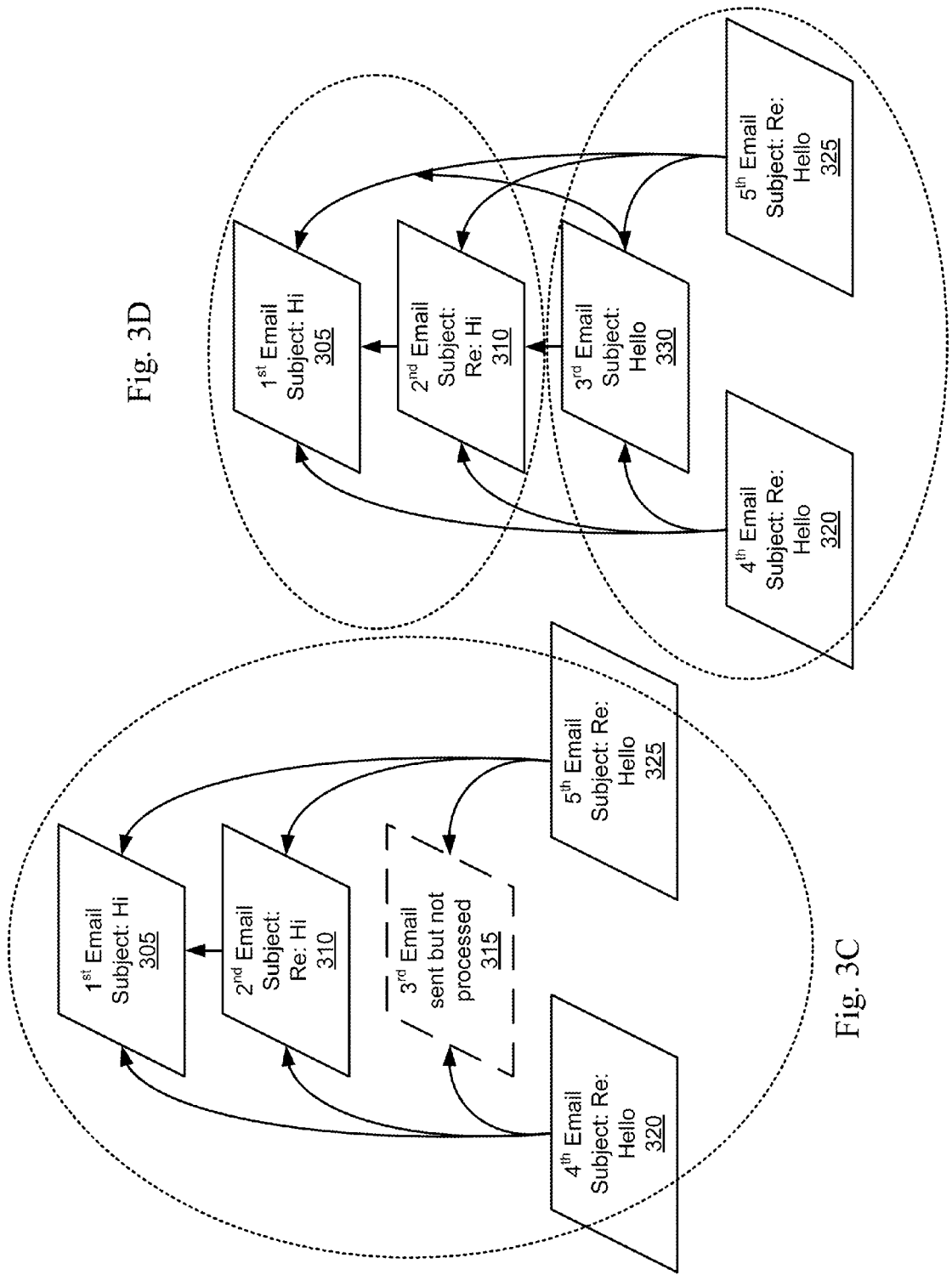

GROUPING EMAIL MESSAGES INTO CONVERSATIONS

FIELD

The various embodiments described herein relate to apparatuses, systems, and methods to group email messages into conversations and reduce redundant text in grouped email messages.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies: Copyright 2011, Apple Inc., All Rights Reserved.

BACKGROUND

An original email message and a chain or thread of related reply messages or forwarded messages can be grouped as a conversation. The embedded attributes (e.g., header information) of a message contain a unique identifier and a chain of message identifiers which can be used to relate the message to replies and forwards. Grouping messages into conversations based upon references in a message's header information alone can be unreliable. Users will often use an existing message, deleting the subject and content, to start a new conversation while being unaware that the header information is still embedded in the message. Additionally, the inclusion of header information is optional and, as a result, not all messages include header information. Reliance on header information alone is over-inclusive in the first scenario and under-inclusive in the second scenario.

Furthermore, reply messages often also include or quote text from the original message or the message to which it is replying. Once messages are grouped into a conversation, this text is often redundant and can be lengthy and distracting.

SUMMARY OF THE DESCRIPTION

Exemplary methods, apparatuses, and systems determine that an indication that a received message was sent in response to another message is present in the received message, determine that header information is included in the received message, select a stored message according to the header information, and display the received message as grouped with the stored message. For one embodiment, if the indication is present but the header information is not included in the received message, exemplary methods, apparatuses, and systems parse a stored message for at least a partial match between the subject of the received message and the subject of the stored message, contents of subject of the stored message and the received message, and sender and recipient participants of the received message and the stored message, and display the received message as grouped with the stored message. For yet another embodiment, exemplary methods, apparatuses, and systems determine that the indication is not present in the received message and display the received message as the root of a new conversation, even if the received message includes header information or a matching subject matter that may otherwise link it to a stored message. In a further embodiment, exemplary methods, apparatuses, and systems parse text of the received message for text that is redundant of text of the stored message, determine that a minimum threshold of consecutive matching characters has been reached, and display the received message with the consecutive matching characters at least partially hidden from view.

BRIEF DESCRIPTION OF THE DRAWINGS

The present invention is illustrated by way of example and not limitation in the figures of the accompanying drawings, in which like references indicate similar elements, and in which:

FIGS. 3A-D illustrate an exemplary grouping of email messages according to header information;

FIG. 7 illustrates an exemplary user interface displaying email messages previews including stacked thumbnail images of attachments;

FIG. 9 illustrates the exemplary user interface of FIG. 7 in which the stacked preview thumbnails have been expanded to show a plurality of individual thumbnails;

FIG. 10 illustrates an exemplary user interface displaying multiple email messages grouped as a conversation in which each message is numbered and redundant text is at least partially hidden;

FIG. 12 illustrates another exemplary user interface displaying multiple email messages grouped as a conversation in which redundant text is at least partially hidden;

DETAILED DESCRIPTION

Various embodiments and aspects of the invention(s) will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Figure 1:
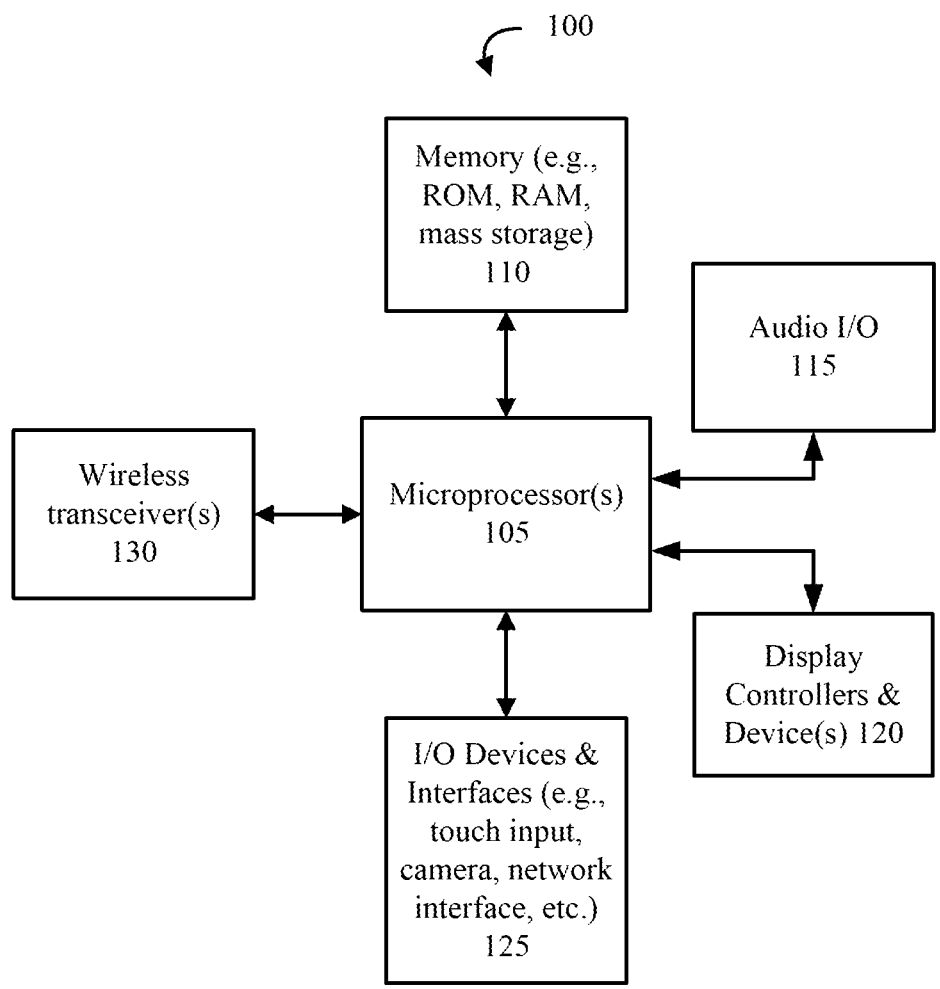
FIG. 1 illustrates, in block diagram form, an exemplary processing system that can group email messages into conversations.

FIG. 1 illustrates, in block diagram form, an exemplary data processing system 100 that can perform email message grouping and reduction of redundant text in grouped messages. Data processing system 100 may include one or more microprocessors 105 and connected system components (e.g., multiple connected chips) or the data processing system 100 may be a system on a chip.

The data processing system 100 includes memory 110 which is coupled to the microprocessor(s) 105. The memory 110 may be used for storing data, metadata, and programs for execution by the microprocessor(s) 105. The memory 110 may include one or more of volatile and non-volatile memories, such as Random Access Memory ("RAM"), Read Only Memory ("ROM"), Flash, Phase Change Memory ("PCM"), or other types of data storage.

The data processing system 100 also includes an audio input/output subsystem 115 which may include a microphone and/or a speaker for, for example, playing back music, providing telephone or voice/video chat functionality through the speaker and microphone, etc.

A display controller and display device 120 provides a visual user interface for the user; this user interface may include a graphical user interface which, for example, is similar to that shown on a Macintosh computer when running Mac OS operating system software or an iPad, iPhone, or similar device when running iOS operating system software.

Data processing system 100 also includes one or more wireless transceivers 130, such as an IEEE 802.11 transceiver, an infrared transceiver, a Bluetooth transceiver, a wireless cellular telephony transceiver (e.g., 1G, 2G, 3G, 4G), or another wireless protocol to connect the data processing system 100 with another device, external component, or a network.

It will be appreciated that one or more buses, may be used to interconnect the various components shown in FIG. 1.

The data processing system 100 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other embodiments, the data processing system 100 may be a network computer or an embedded processing device within another device or consumer electronic product.

The system 100 also includes one or more input or output ("I/O") devices and interfaces 125 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 100. The I/O devices and interfaces 125 may include a connector for a dock or a connector for a USB interface, FireWire, etc. to connect the system 100 with another device, external component, or a network.

It will be appreciated that additional components, not shown, may also be part of the system 100, and, in certain embodiments, fewer components than that shown in FIG. 1 may also be used in a data processing system 100. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 110 or other machine-readable storage medium. The software may further be transmitted or received over a network (not shown) via a network interface device 125. In various embodiments, hardwired circuitry may be used in combination with the software instructions to implement the present embodiments. Thus, the techniques are not limited to any specific combination of hardware circuitry and software, or to any particular source for the instructions executed by the data processing system 100.

Figure 2:
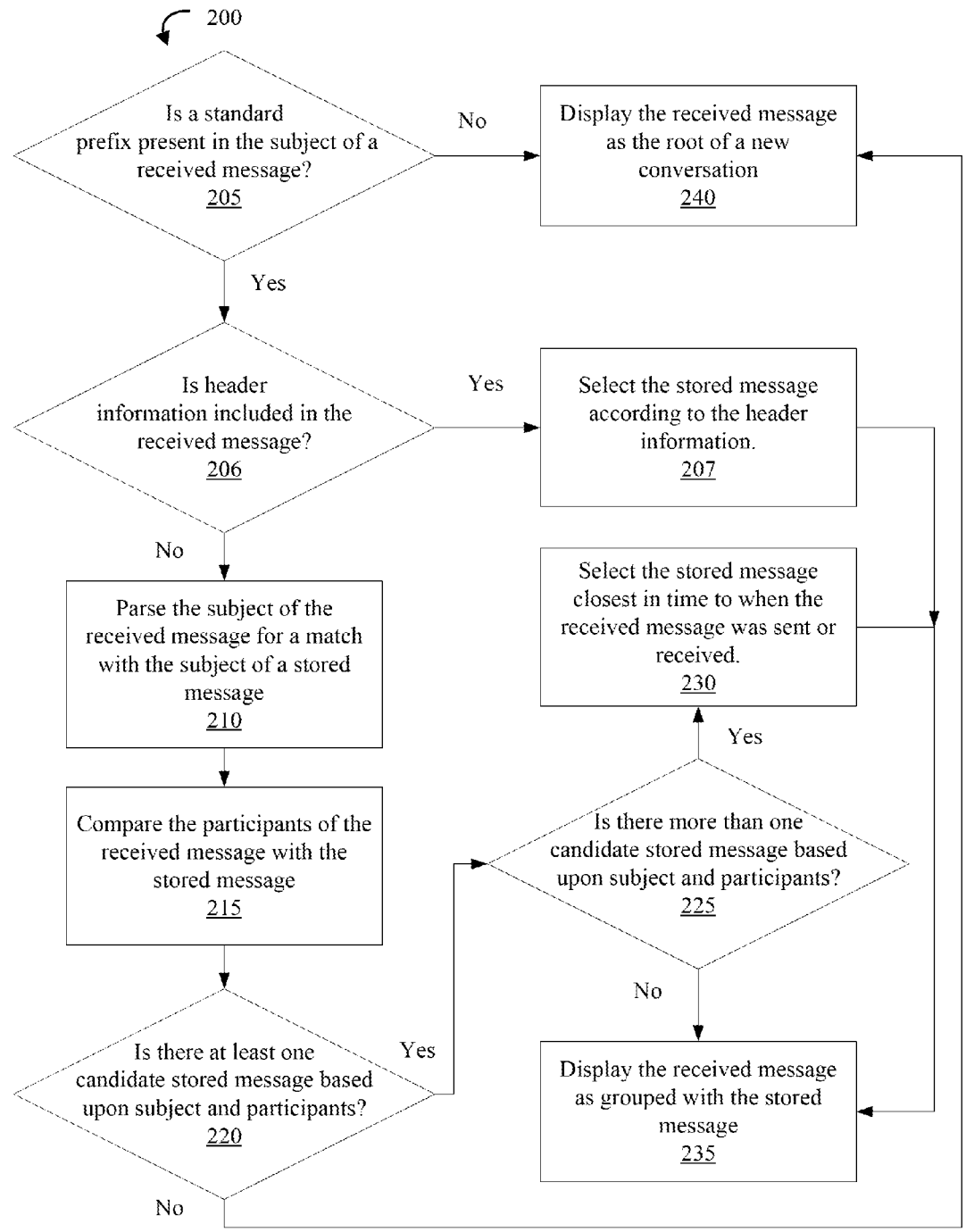
FIG. 2 is a flow chart that illustrates an exemplary method of grouping email messages into conversations.

FIG. 2 is a flow chart that illustrates an exemplary method 200 of grouping email messages. At block 205, the data processing system 100 determines if the received email message includes an indication that the received email message was sent in response to another email message. For example, the data processing system 100 determines if a standard prefix is present in the subject field of a received email message. For one embodiment, the standard prefix indicates that the received message is a reply message (e.g., including the prefix "Re:"). For one embodiment, the data processing system 100 also parses the subject field of the received message for non-standard prefixes, repeated prefixes, suffixes, or other patterns that indicate that the message is a reply. Alternatively, another prefix is included in the subject (e.g., indicating that the message is a forward and including the prefix "Fwd:"). Exemplary prefixes (in a plurality of languages) include: re, atb., ats., aw, ha, odgovor, odp, per, r, sv, vs, ynt, АП, Ж ayan, OTH., उत्तर, ตอบกลับ, 회신, 答复, 回信, HA, رد, جواب, fwd, fw, >>, ed, fs, I, ILT, Pārs., pd, Persi Persiųsta, sta, Proslijedi, rv, tr, vb, vl, vs, wg, ПР, Препратено, अग्रेषित, ส่งต่อ, 전달, 转发, ادي, ايجاد توج. Exemplary repeated prefixes include repetitions in the same language (e.g., "Re: Re: Hello") and repetitions in multiple languages (e.g., "회신: Re: Hello"). Exemplary suffixes include "Even better recipe (was: Best recipe)" and "How do I cook a turkey [SOLVED]." For an alternate embodiment, the data processing system 100 determines if the received email message includes another indication that the received email message was sent in response to another email message such as header information or metadata describing the received message as a response. For the ease of description, exemplary embodiments described herein refer to a standard prefix, which is interchangeable with another indication that the received email message was sent in response to another email.

At block 206, if the prefix is present, the data processing system 100 determines if header information is included in the received message. For example, the data processing system 100 checks for reference header data or in-reply-to header data to identify a stored message. For one embodiment, header information refers to Common Internet Message Headers, e.g., as described in Request for Comments ("RFC") 2076, which contain a references field (per RFC 822) comprised of a list of related messages often using Message-ID's (per RFC 1036). As used herein, header information refers to header data or metadata that identifies messages that are related to a received message. For one embodiment, the header information is distinct from the indication that the received email message was sent in response to another email.

For an alternate embodiment, if the prefix is not present but the sender of the received message is from an automated sender or on a user-defined list of participants, the data processing system 100 proceeds by parsing the subject and sender of the received message for a match with the subject and sender of a stored message. If a matching stored message is found, the received message is grouped with the stored message.

At block 207, if header information is present, the data processing system 100 selects the stored message identified by the header information as a part of a conversation to which the received message belongs. At block 235, the received message is displayed as grouped with the selected stored message.

FIGS. 3A-3D illustrate exemplary groupings of email messages according to header information. For one embodiment, in addition to grouping the received message with the selected stored message, the data processing system 100 determines if any other stored messages should be grouped as part of the conversation. For example, referring to FIG. 3A, a conversation of three messages, A, B, and C, is exchanged, such that B is a reply to A and C is a reply to B. If message B only includes header information that references message A, message C only includes header information that references message B, and messages A and C are processed prior to message B, messages A and C would be deemed to be separate conversations based upon the included header information and the absence of message B. Once message B is processed (indicated by bold highlighting in FIG. 3A), it would be grouped with message A as described above with reference to blocks 207 and 235. Additionally, the data processing searches for stored messages that include header information that reference message B. Message C is determined to reference message B and message C is merged into the conversation grouping of messages A and B. The grouping of messages A, B, and C into a single conversation is illustrated by the broken line circle around all three messages. For one embodiment, if message C included any further messages (e.g., replies to message C), they would be merged into the conversation grouping of messages A and B as well.

Figure 3B:
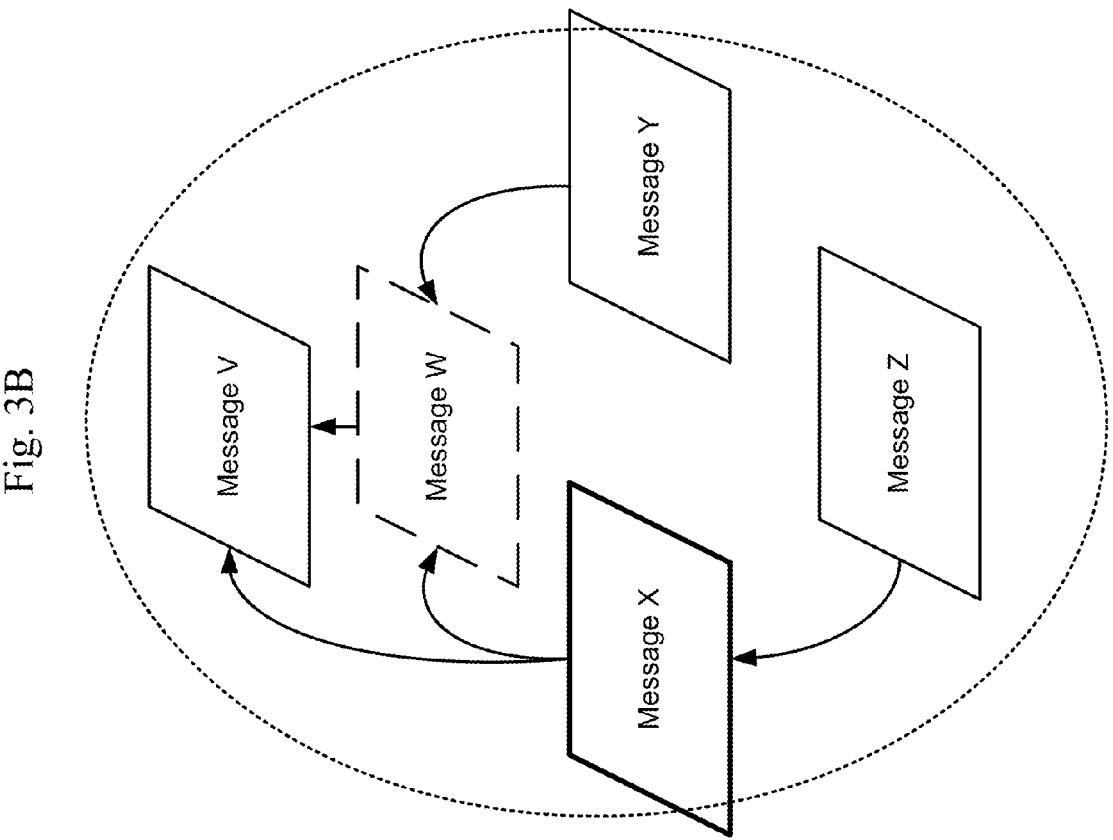
Figure 3A:
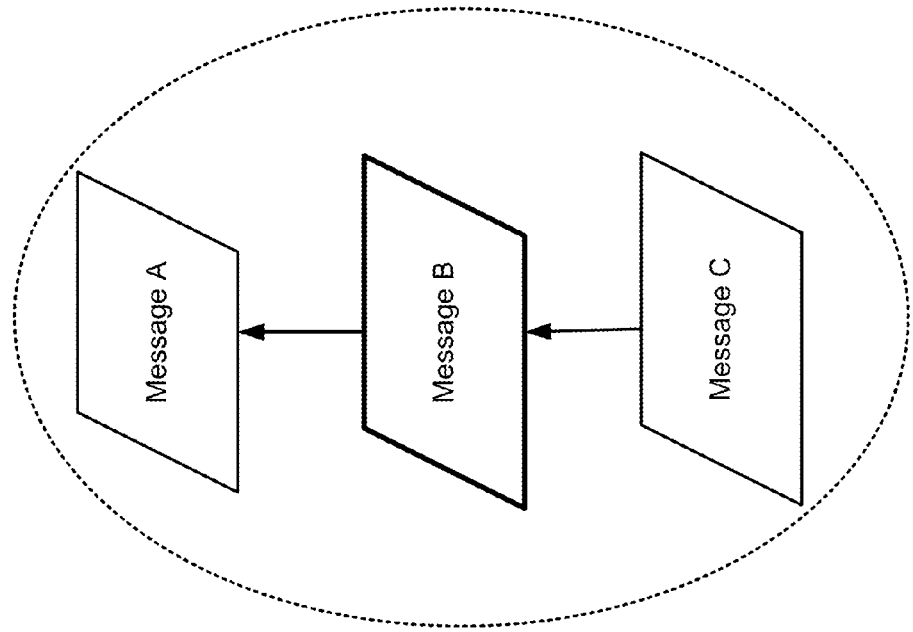

For yet another example, referring to FIG. 3B, a conversation of five messages, V, W, X, Y, and Z is exchanged. Message W is a reply to message V, messages X and Y are replies to message W, and message Z is a reply to message X. In this example, message X includes header information that references messages V and W, message Y only includes header information that references message W, and message Z only includes header information that references message X. If messages V, Y, and Z all processed prior to (or without processing) messages W and X, each of the three messages V, Y, and Z would be treated as separate conversations because they either don't reference another message (in the case of message V) or reference separate unprocessed messages (in the case of messages Y and Z). When the data processing system 100 processes message X (indicated by the bold highlighting of message X), message X is grouped with message V because it references message V. Additionally, message Z is grouped into the conversation with messages V and X because message Z references message X. Lastly, message Y is grouped into the conversation with messages V, X, and Z because both message X and message Y commonly reference message W (which has yet to be processed, indicated by the broken line around message W). The grouping of messages V, X, Y and Z into a single conversation is illustrated by the broken line circle around all four messages.

For one embodiment, the header information includes identifiers for all messages in a chain of messages that precede the current, received message. For example, in FIG. 3C, a first email message 305 is the original message in a conversation. A second email message 310 is a reply to the first email message 305. The fourth and fifth email messages 320 and 325 are replies to a third email message 315 that has yet to be processed (e.g., it has been sent but not received or has not otherwise been processed by the data processing system 100). The header information for the fourth and fifth email messages 320 and 325, however, also link them to the first and second email messages 305 and 310. In determining how to group the fourth and fifth email messages 320 and 325, the data processing system 100 determines that the fourth and fifth email messages 320 and 325 each contain a prefix and looks for the most recent message without a prefix in the chain of email messages linked by the header information included in the fourth and fifth email messages 320 and 325. The first email message 305 is only message in the chain of email messages without a prefix. The same process is applied to the second email message 310. As a result, the first, second, fourth, and fifth email messages 305, 310, 320, and 325 are all grouped as a single conversation based upon the original message 305 (as illustrated by the broken line circle around the four messages). These four messages are grouped as single conversation based upon the second, fourth, and fifth messages 310, 320, and 325 including header information linking them to the first email message 305 (and/or to each other), the inclusion of a prefix in each of the subject lines of the second, fourth, and fifth messages 310, 320, and 325, and the lack of a prefix in the subject line of the first message 305. The messages are grouped as a single conversation, despite the fact that the contents of the subject line following the prefix has changed in the fourth and fifth email messages 320 and 325.

Once the third email message 330 is received and processed (illustrated as a solid line in FIG. 3D as compared to a broken line in FIG. 3C), the same process as described with reference to FIG. 3C is applied to the third email message 330. Given that the third email message 330 does not include a prefix, the data processing system 100 determines that the third email message 330 is the root/beginning of a new conversation and is not grouped with the first and second email messages 305 and 310, despite the fact that the third email message 330 contains header information linking it to the first and second email messages 305 and 310. Additionally, the data processing system 100 examines the existing conversation grouped around the first email message 305 to determine if any messages should be grouped with the third email message 330 as a separate conversation. The fourth and fifth email messages 320 and 325 are replies to a third email message 330 and include header information referencing the third email message 330, and the third email message 330 is the most recent message (relative to the fourth and fifth email messages 320 and 325) in the chain of messages without a prefix. The data processing system 100 splits the fourth and fifth email messages 320 and 325 from the original conversation and groups them with the third email message 300. While the header information links all of the illustrated email messages in the chain, the data processing system 100 has created two separate conversations based upon the presence of a prefix or lack thereof in the chain of messages (conversation groupings are illustrated by the broken line circles).

Returning to the method 200 in FIG. 2, at block 210, if header information is not available (and again, if the prefix is present), the data processing system 100 parses one or more stored messages for a match between the contents of the subject of the stored message(s) and what follows the prefix in the subject of the received message (or, in the case of a received message without a prefix but from an automated sender/sender on a user-defined list of participants, just the subject of the received message). For one embodiment, the data processing system 100 seeks an exact match between the subject contents that follow the prefix in the received message and the contents of the stored message. For example, the data processing system 100 performs a character by character comparison of the two subjects to determine if there are any differences. For an alternate embodiment, the data processing system 100 allows for a threshold of difference between the subjects that will still result in a match. For one embodiment, if the subject of the stored message contains a prefix, that prefix is ignored for the purpose of the match.

At block 215, the data processing system 100 compares the (sender and recipient) participants of the received message with the stored message. For one embodiment, the comparison results in a match if two participants are the same in both the received message and the one or more stored messages that have a matching. Alternatively, a match is made when all of the participants are the same in both the received message and the stored message. For one embodiment, the data processing system 100 selects the stored message with the most participants in common. For an additional embodiment, the data processing system 100 gives preference in matching to a user-defined list of participants.

At block 220, the data processing system 100 determines if there is at least one candidate stored message based upon the subject and participant comparisons. If so, at block 225, the data processing system 100 determines if there is more than one candidate stored message based upon the subject and participant comparisons. For one embodiment, multiple candidates are a part of the same conversation. Alternatively, the two or more candidates are not part of the same conversation.

For an alternate embodiment, the data processing system 100 determines if there is at least one candidate stored message based upon quoted text included in the received message. For example, the data processing system 100 could perform a comparison between quoted text and the body text of stored messages.

At block 230, if there is more than one candidate stored message, the data processing system 100 selects the candidate stored message that was sent or received closest in time to when the received message was sent or received. For example, if two messages from a single conversation are deemed candidates, the data processing system 100 will group the received message with the stored message that was sent or received closest in time to the received message. All three messages may be grouped as a part of the same conversation, but by using the time difference between messages, the conversation can be displayed in chronological order.

At block 235, if there is only one candidate stored message, or after selecting among candidates, the data processing system 100 displays the received message as grouped with the (selected) candidate stored message.

If, at block 205, a standard prefix is not present in the subject field of the received message, or if, at block 220, a candidate stored message is not found based upon subject and/or participants, the data processing system 100, at block 240, displays the received message as the root of a new conversation. For example, the received message may include header information identifying a stored message as the root (e.g., the start of a conversation) or as a predecessor to the received message (e.g., the received message was in response to a message in a chain of messages that was subsequent to the start of the conversation). Despite the header information, the lack of the standard prefix indicates that the received message is the root or start of a new conversation. If the received message includes header information, however, the header information is used to determine if any previously processed messages should be grouped with the received message as described above (e.g. messages sent in response to the received message but processed prior to the received message).

Figure 4:
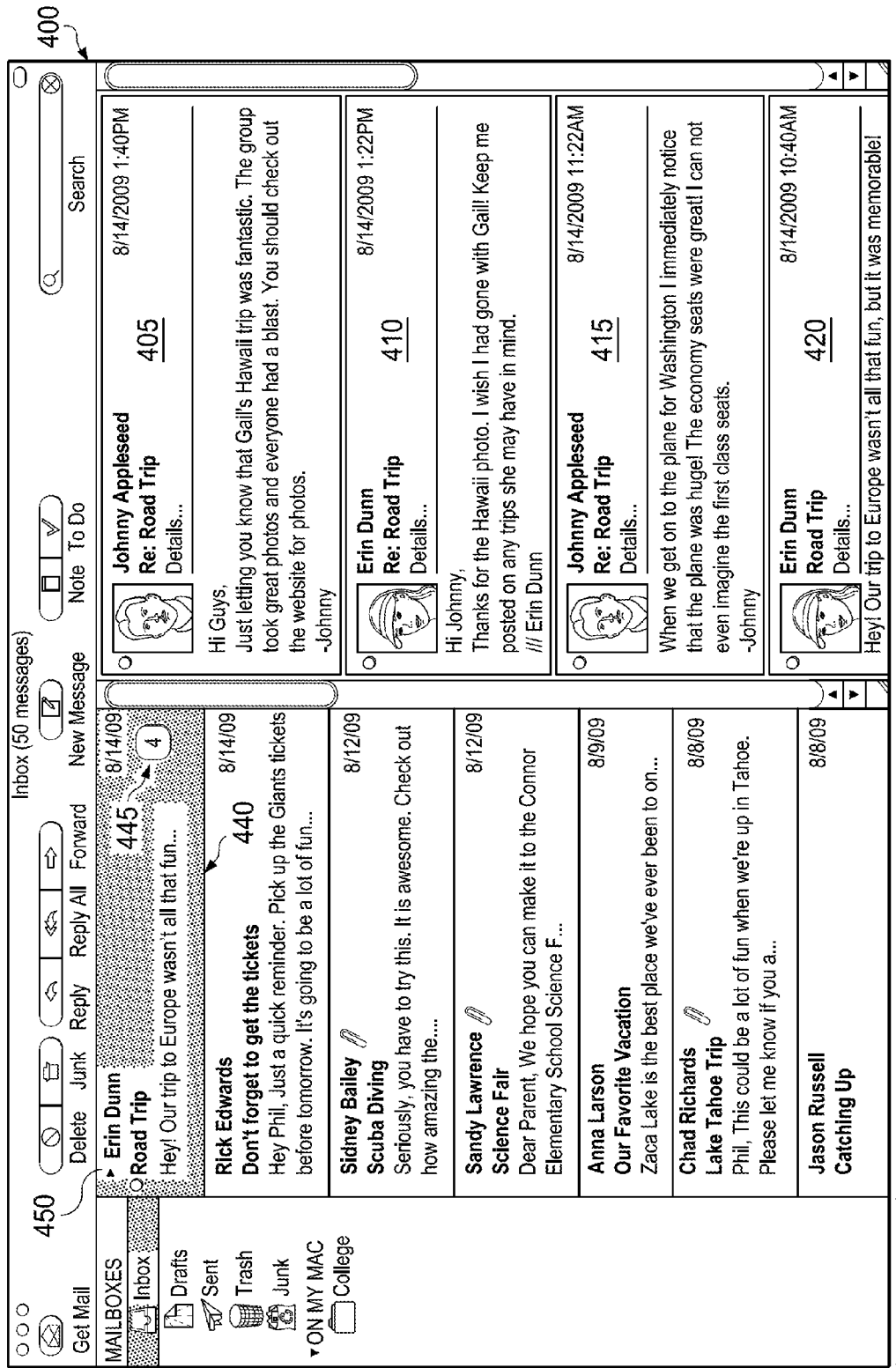
FIG. 4 illustrates an exemplary user interface displaying multiple email messages grouped as a conversation.

FIG. 4 illustrates an exemplary user interface displaying multiple email messages grouped as a conversation. The email window 400 displays a chain of messages 405, 410, 415, and 420. For one embodiment, the chain of messages is displayed in chronological order from the most recent message 405 to the oldest, original message 420.

For one embodiment, the email window 400 includes multiple panes. For example, the chain of messages is shown in a message pane 425 while a plurality of different messages or conversations is listed in a preview pane 430. For example, a preview pane item may include one or more of the sender of a message, at least a portion of the subject of the message, at least a portion of the body of the message, a date or time when the message was sent, attachment previews, etc. The selection of an item in preview pane 430 results in displaying a message or conversation in the message pane 425.

For one embodiment, the email window 400 also includes a mailboxes pane 445 that includes multiple mailboxes, folders, or other sources for messages. For example, the inbox is currently selected in mailboxes pane 435, which results in the messages and conversations contained in the inbox being displayed as preview pane items in the preview pane 430.

For one embodiment, preview pane items include an indication when an item represents a conversation (as opposed to a single message). For example, the selected preview pane item 440 includes a badge 445 that designates that there are four messages that are a part of this conversation. For one embodiment, when the preview pane item represents a conversation, the preview pane item only displays content from one of the messages in the conversation. For example, the selected preview pane item 440 includes an excerpt of the original message 420. Alternatively, the preview pane item displays content from the most recent message in the conversation or another message in the conversation.

For one embodiment, preview pane items that represent a conversation can be expanded to display sub-items for each message in the conversation. The preview pane item may be expanded in response to a user input. For example, preview pane item 440 includes a selectable expansion arrow 450.

Figure 5:
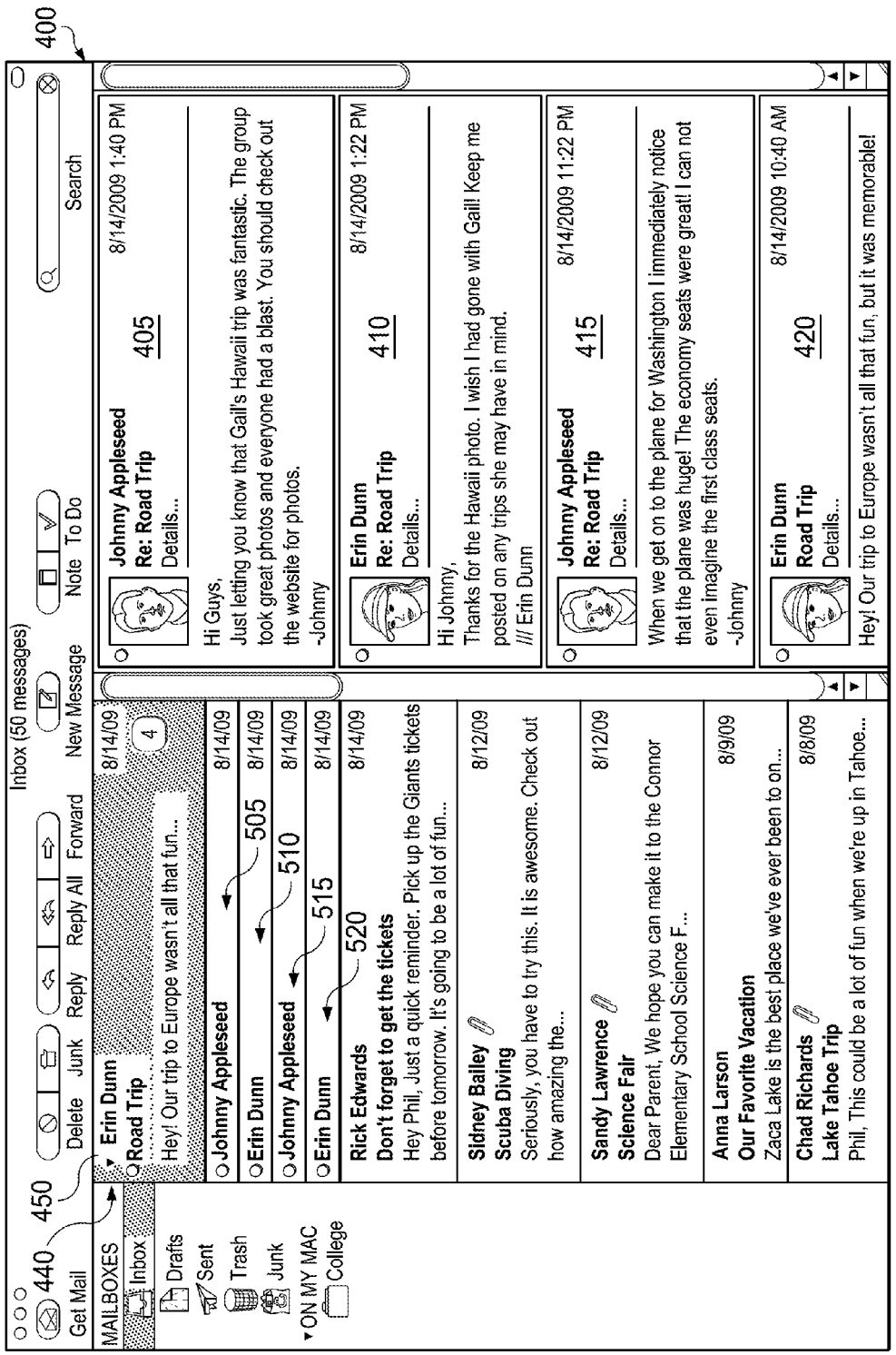
FIG. 5 illustrates the exemplary user interface of FIG. 4 after expanding a conversation preview pane item.

FIG. 5 illustrates the exemplary user interface of FIG. 4 after expanding a conversation preview pane item 440 by, e.g., clicking on the expansion arrow 450, selecting an option in a drop-down menu, etc. The expanded conversation preview pane item 440 includes sub-items 505, 510, 515, 520 each corresponding, respectively, to messages 405, 410, 415, and 420 in the conversation. For one embodiment, each of the sub-items 505, 510, 515, and 520 includes a minimal preview such as only one or more of the sender and date of each message. Alternatively, the sub-items 505, 510, 515, and 520 include additional preview items such as one or more of a portion of the subject of the message, a portion of the body of the message, attachment previews, etc. For one embodiment, each of the preview item 440 and sub-items 505, 510, 515, and 520 is selectable and said selection will display the entire conversation or only a particular message in the message pane 425. For example, in FIG. 5, preview item 440 is selected and, as a result, the conversation is displayed in message pane 425.

Figure 6:
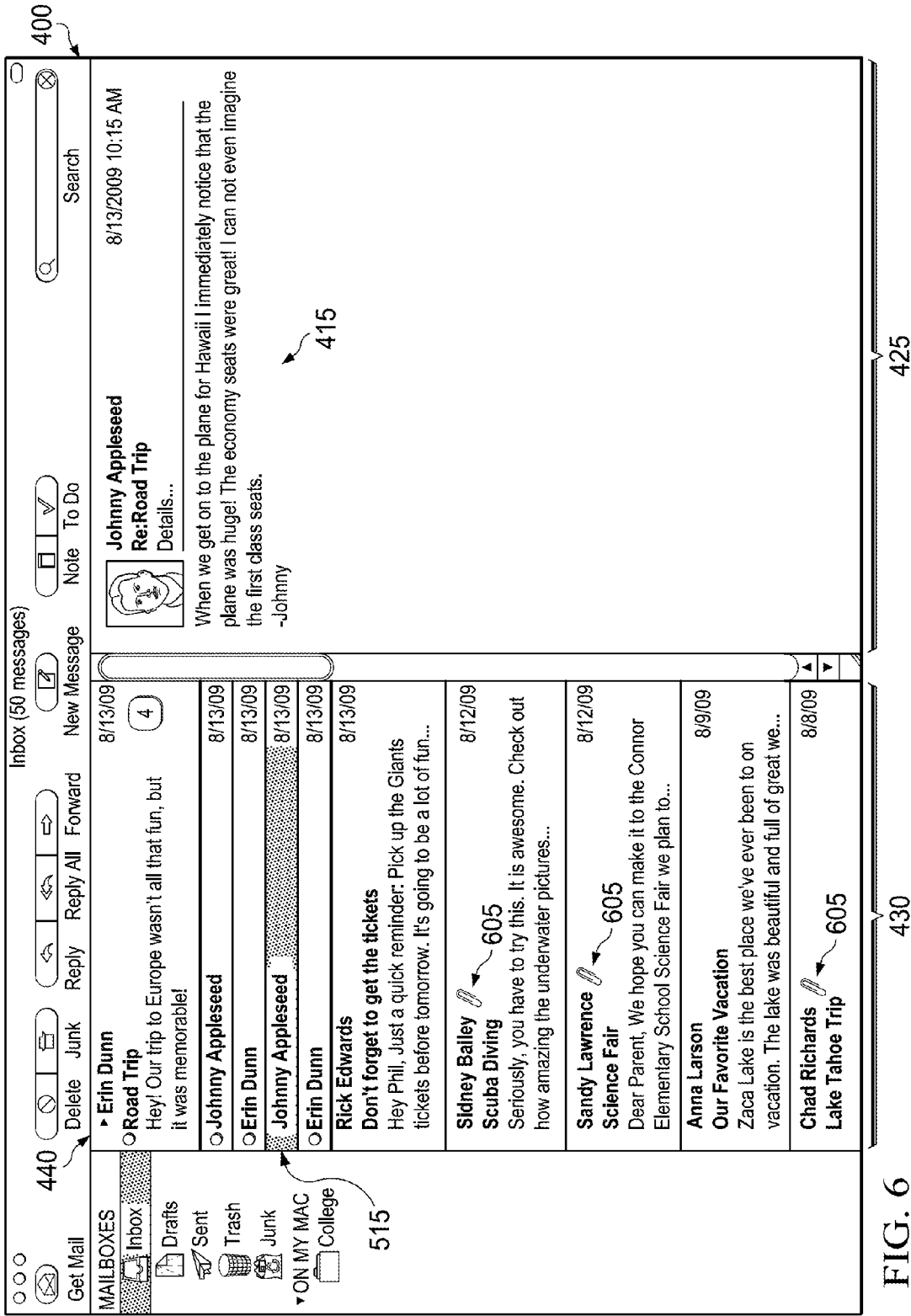
FIG. 6 illustrates the exemplary user interface of FIG. 5 in which the conversation preview pane item has been expanded and a sub-item has been selected.

FIG. 6 illustrates the exemplary user interface of FIG. 5 in which the conversation preview pane item 440 has been expanded and a sub-item 515 has been selected. In this exemplary embodiment, the selection of a sub-item 515 results in only its corresponding message 415 being displayed in message pane 425. Alternatively, for one embodiment, the selection of the sub-item 515 maintains the display of the conversation and results in the corresponding message 415 being highlighted, bolded, or displayed in another matter to draw a distinction between message 415 and messages 405, 410, and 420. For one embodiment, selecting a sub-item 515 results in scrolling the corresponding message 415 in the message pane 425 to a predetermined position, e.g., if the corresponding message 415 is out of the visible are of the message pane 425, the scrolling brings the message 415 into view.

For one embodiment, items displayed in preview pane 430 utilize a single icon 605 to designate that the corresponding message includes an attached file. For example, a paperclip icon is used in the exemplary illustration to let a user know (via the preview) that the sender has attached a file to the message. For an alternate embodiment, the preview pane items utilize a thumbnail image of the one or more attached files instead of or in addition to the icon 605 used commonly among the message preview items.

Figure 7:
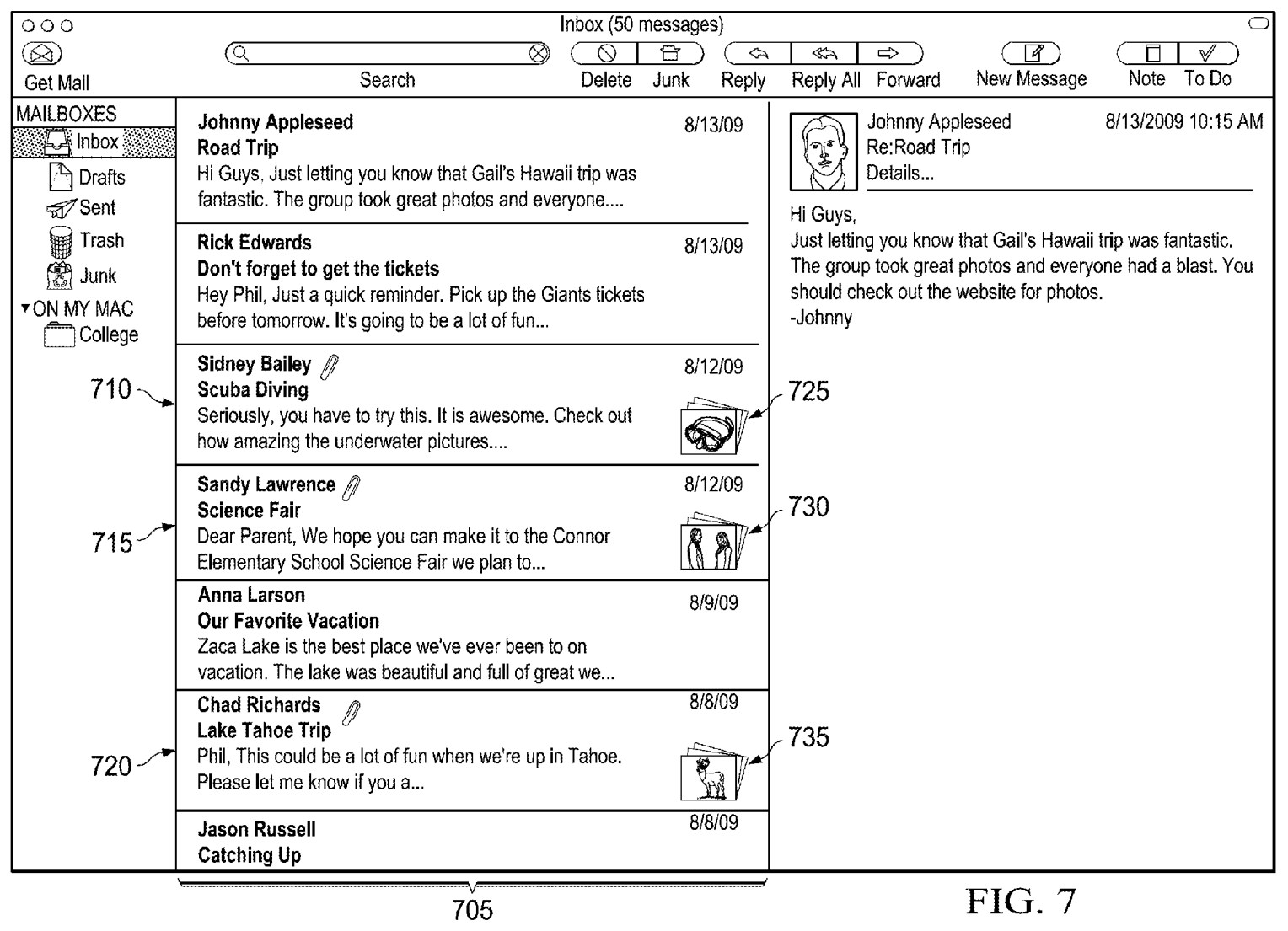

FIG. 7 illustrates an exemplary user interface in which the email messages preview items 710, 715, and 720 in the preview pane 705 include stacked thumbnail images of attachments 725, 730, and 735. For one embodiment, the stacked thumbnail images 725, 730, and 735 each represent a plurality of files attached to corresponding email messages. For example, message preview item 710 includes a stack of thumbnail images 725 giving a preview of one or more of image files attached to its corresponding email message. For one embodiment, the stack of thumbnail images 725 has the appearance of a fanned stack of photographs with the top image (of an attached file) fully visible and the other images at least partially obscured.

For one embodiment, each stack of thumbnail images 725, 730, and 735 is illustrated using a common number of stacked thumbnails, e.g., three thumbnails, with a thumbnail image of one of the files attached to the corresponding email message as the top thumbnail on the stack. For one embodiment, each stack of thumbnail images 725, 730, and 735 includes a number of stack thumbnails that corresponds to the number of files attached to each corresponding email message. For example, for a single attachment, the message preview item may only include a single thumbnail rather than a stack. For a plurality of attachments, the message preview item may include a stack of thumbnails including the same number of thumbnails as the number of attachments. For one embodiment, the number of files attached to an email message is indicated by a number placed on top of the stack.

Figure 8:
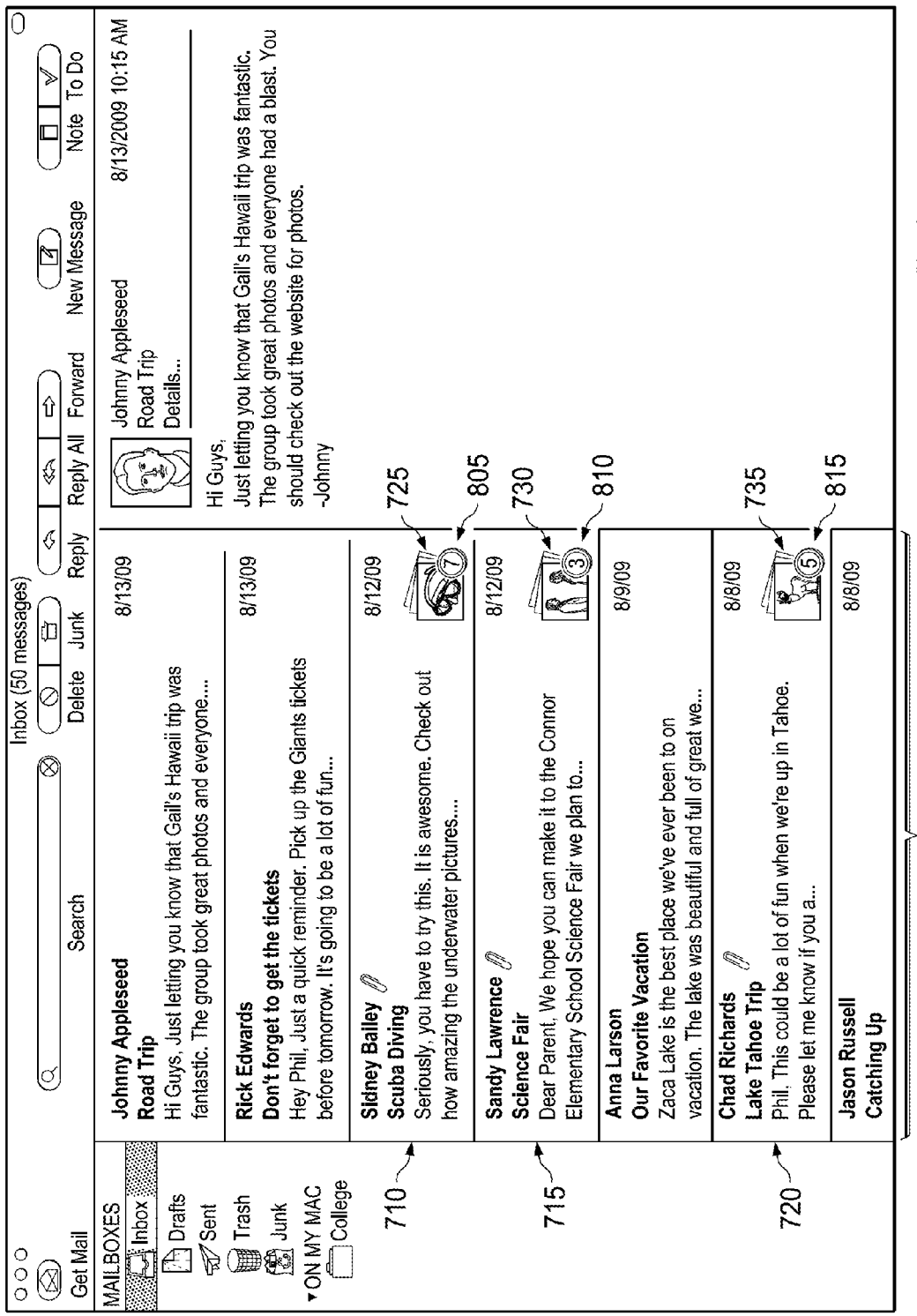
FIG. 8 illustrates the exemplary user interface of FIG. 7 in which the stacked thumbnail images include a designation of how many files are attached to the corresponding email message.

FIG. 8 illustrates the exemplary user interface of FIG. 7 in which the stacked thumbnail images 725, 730, and 735 include designations 805, 810, and 815 of how many files are attached to each corresponding email message. For example, message preview item 710 includes a stacked thumbnail image 725 with a designation 805 indicating that its corresponding email message has 7 files attached to it. Message preview item 715 includes a stacked thumbnail image 730 with a designation 810 indicating that its corresponding email message has 3 files attached to it. Message preview item 720 includes a stacked thumbnail image 735 with a designation 815 indicating that its corresponding email message has 5 files attached to it.

For one embodiment, the stacked thumbnail images 725, 730, and 735, in response to a user input, expand to show an individual thumbnail for each file attached to the corresponding email message.

Figure 9:
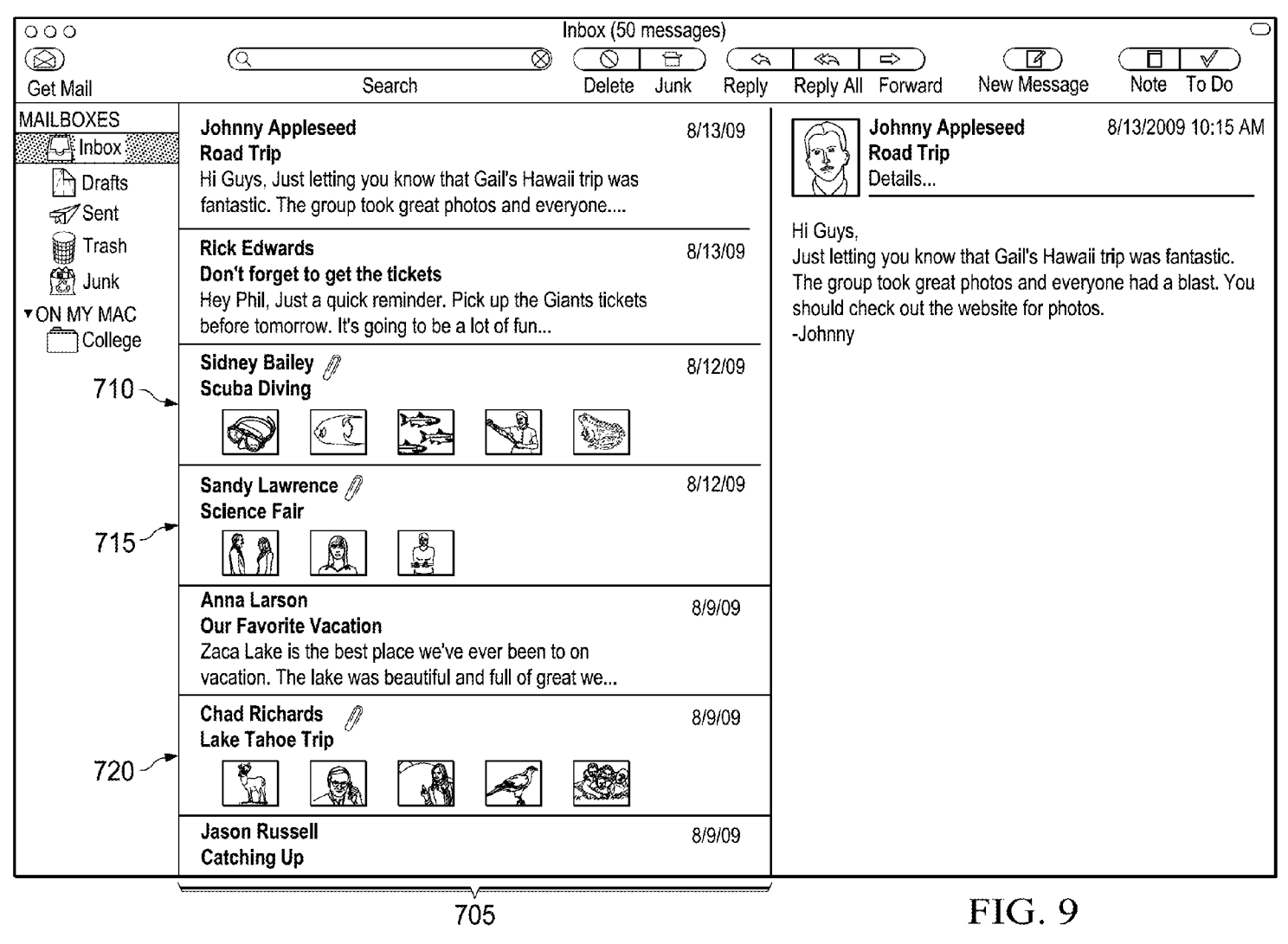

FIG. 9 illustrates the exemplary user interface of FIG. 7 in which the stacked preview thumbnails 725, 730, and 735 each have been expanded to show a plurality of individual thumbnails. For example, message preview item 715 includes three thumbnail images, each including a preview of the corresponding three files attached to the corresponding email message and message preview item 720 includes five thumbnail images, each including a preview of the corresponding five files attached to the corresponding email message. For one embodiment, the amount of thumbnails shown in a message preview item is limited. For example, message preview item 710 includes five thumbnail images representing five of the seven files attached to the corresponding email message. For an alternate embodiment, the preview item includes a scroll bar to enable a user to see all thumbnail images when they do not all fit within the preview pane 705.

Figure 10:
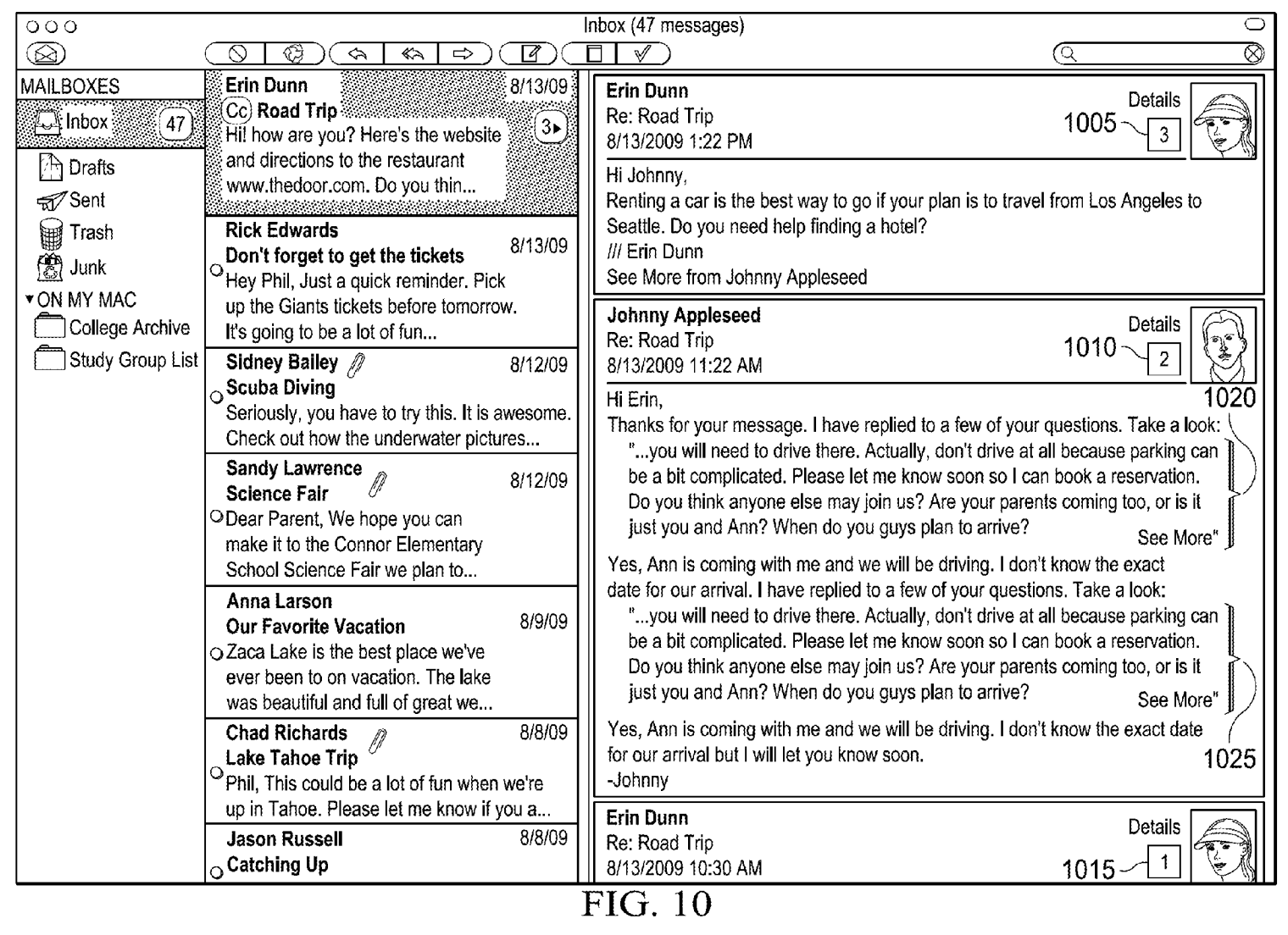

FIG. 10 illustrates an exemplary user interface displaying multiple email messages grouped as a conversation in which each message is numbered (1005, 1010, and 1015). For one embodiment the messages in a conversation are numbered according to the chronological order in which they were sent or received. Alternatively, or additionally, the messages are numbered according to a different ordering, e.g., reverse chronological order, according to the priority of the messages, only received messages are numbered, etc.

Reply messages often include or quote text from the original message or the message to which it is replying. Once messages are grouped into a conversation, this text is often redundant and can be lengthy and distracting. For one embodiment, the data processing system 100 identifies and hides redundant text in a conversation. For one embodiment, all redundant text from the original message is hidden. For example, message number 3 in the conversation illustrated in FIG. 10 includes "See More from Johnny Appleseed" to indicate that redundant text from the previous message from Johnny Appleseed has been hidden.

Alternatively, the data processing system 100 may display a small portion of the redundant text to give a reader some context as to what was text was hidden (e.g., three lines of redundant text are displayed in quotes with an ellipses to indicate that additional redundant text is hidden). For example, message number 2 in the conversation illustrated in FIG. 10 shows two quoted portions in the body of the message. For one embodiment, if the matching text is redundant text from multiple previous messages, the preview utilizes different color texts for the text from each of the previous messages. For example, if there were two messages prior to message number 2 and redundant text from each of the prior two messages was found in message number 2, the preview text from a first message would be shown in a first quote 1020 in a first color (e.g., blue) and the preview text from a second message would be shown in the other quote 1025 in a second color (e.g., green). Alternatively, multiple colors (e.g., signifying quoted language from multiple messages) are included in the same quote, all preview text is the same color, despite being from multiple messages, but different from the non-redundant text (e.g., blue is used for redundant text, while non-redundant text is black), or all text, redundant and non-redundant, is the same color.

For one embodiment, a small portion of redundant text is a preview of the redundant text. For example, the preview may be the first plurality of words or one or more sentences from the beginning or end of that block of redundant text. Alternatively, the preview includes a plurality of words from the beginning of the block of redundant text and a plurality of words from the end of the block of redundant text. For an alternate embodiment, the small portion of redundant text is a summary of the block of redundant text. For one embodiment, multiple blocks of matching text separated by non-matching text are found by the parsing and each block of matching text, if greater than threshold, is at least partially hidden (e.g., as shown in message number 2).

Figure 11:
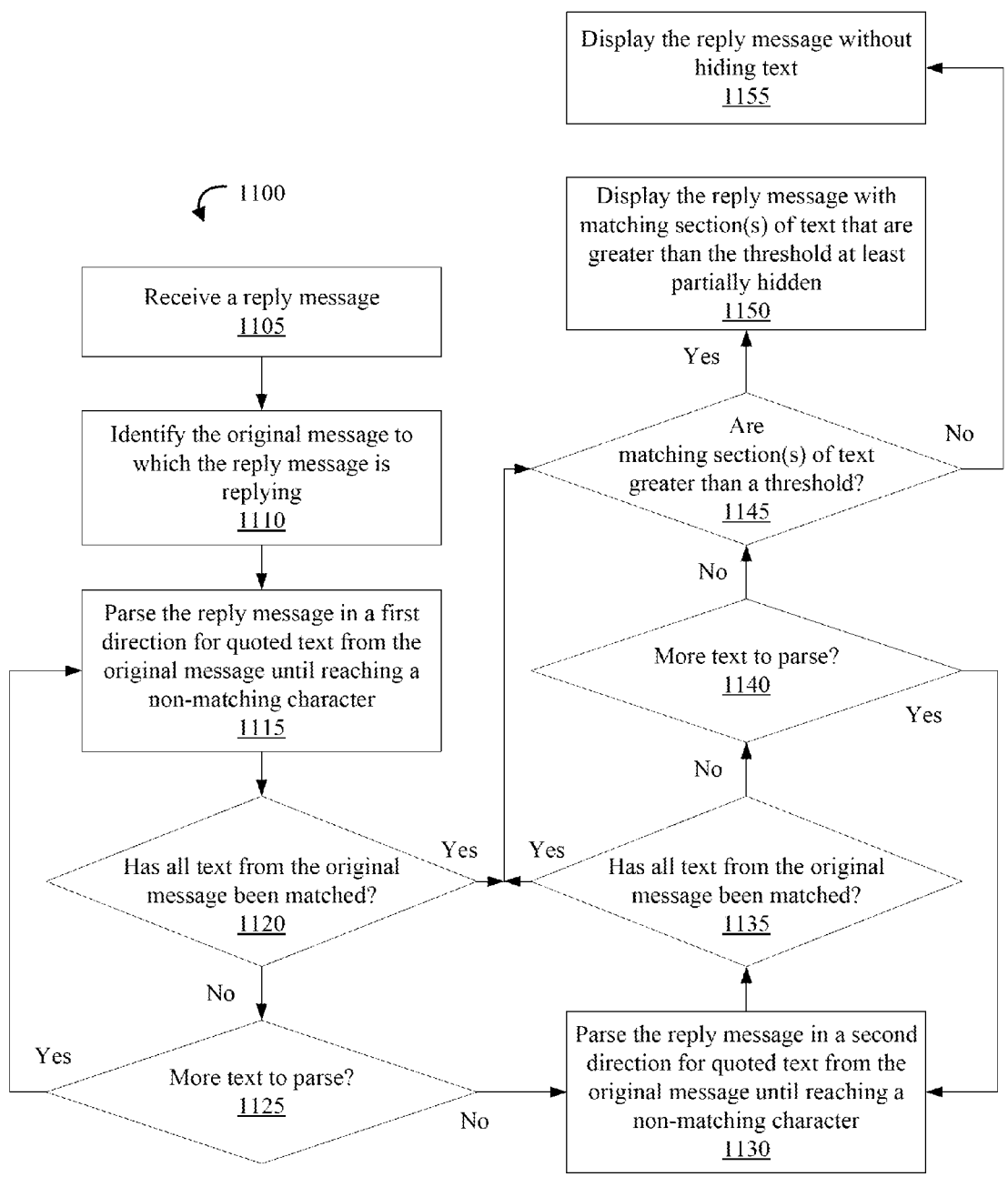
FIG. 11 is a flow chart that illustrates an exemplary method of reducing redundant text in a conversation.

FIG. 11 is a flow chart that illustrates an exemplary method 1100 of reducing redundant text in a conversation. At block 1105, the data processing system 100 receives a reply (or forward) message. At block 1110, the data processing system 100 identifies the original message to which the reply message is replying. For one embodiment, the data processing system 100 identifies the original message using the method 200 described above. For one embodiment, if the original message cannot be found, the data processing system 100 uses other messages in the conversation to identify redundant text in the reply message.

At block 1115, the data processing system 100 parses the reply message in a first direction for redundant text from the original message until reaching a non-matching character. For one embodiment, the first direction is from the beginning of the reply message towards the end of the reply message. Alternatively, the first direction is from the end of the reply message towards the beginning of the reply message. For one embodiment, the parsing includes a character by character search of the reply message for the content of the original message. For one embodiment, the data processing system 100 sets a minimum threshold for a match. For example, the data processing system 100 may find a matching character, or matching consecutive characters, but not consider it a match until a word, string of a particular size, sentence, etc. from the original message has been matched to consecutive characters in the reply message.

For one embodiment, the minimum threshold is a line of text, i.e., a string of characters without a line break (e.g., a block-level tag such as HyperText Markup Language (HTML) tags <br>, <div>, and <p>). For example, the data processing system 100 parses the text of the reply message character by character and does not consider the reply message to include redundant text until an entire line of text in the reply message matches text from the original message.

For one embodiment, the data processing system 100 parses the reply message for a match of a first portion of the original message. Once the first portion is found, the parsing continues by searching for a match of the next portion of the original message, and so on until a non-matching character is found or until the data processing system 100 reaches the end of the original message.

At block 1120, the data processing system 100 determines if all of the text from original message has been matched to text in the reply message. If the data processing system 100 has yet to match all of the text from the original message, at block 1125, the data processing system 100 determines if there is more text to parse. For one embodiment, the data processing system 100 determines that there is no more text to parse if it has reached the end of the reply message without matching all of the content from the original message. For an alternate embodiment, the data processing system 100 determines that there is no more text to parse if it has reached a threshold of consecutive non-matching characters. If there is more text to parse in the first direction, the data processing system 100 resumes parsing at block 1115.

At block 1130, if the data processing system 100 determined that there is no more text to parse in the first direction and it has yet to match all of text from the original message, the data processing system 100 parses the reply message in a second direction for redundant text from the original message until reaching a non-matching character in a manner similar to the parsing described above with reference to block 1115. For one embodiment, the second direction is the opposite direction of the first direction.

At block 1135, the data processing system 100 determines if all of the text from original message has been matched to text in the reply message. If the data processing system 100 has yet to match all of the text from the original message, at block 1140, the data processing system 100 determines if there is more text to parse. If there is more text to parse in the second direction, the data processing system 100 resumes parsing in the second direction at block 1130.

If all the text from the original message has been found in the reply message in block 1120 or in block 1135, or if the parsing has reached the end of the second direction at block 1140, the data processing system 100 determines if any matching sections of text are greater than a threshold at block 1145. For one embodiment, the threshold for the matching sections is an amount of pixels that would be used to display the sections of matching text. Alternatively, the threshold is a minimum number of consecutive characters, a number of lines of text, etc. At block 1150, the data processing system 100 displays the reply message with one or more matching sections of text that are each greater than the threshold at least partially hidden. For one embodiment, the data processing system 100 further identifies and hides an attribute automatically added to the reply message above the block of redundant text. For example, an automatically added attribute may indicate that the text is redundant of text in the original message by including "On <date> at <time>, <name or email address> wrote:" or a block of similar text.

At block 1155, if there are no matching blocks of text, or if none of the matching blocks are greater than the threshold, the data processing system 100 displays the reply message without hiding any text.

For one embodiment, the data processing system 100 parses the reply message for a match of a first portion of the original message according to the method 1100 at multiple starting points. For example, if a match was found in the reply message for a first portion of the original message, the data processing system 100 would continue to look for all other occurrences of that first portion of the original message in the reply message and continue parsing from that point. If multiple matches are found for the first portion of the original message, the data processing system 100 determines that the match that contains the largest string of matching characters is redundant text. For one embodiment, if two matches include the same number of matching characters, the data processing system 100 determines the matching portion of text with the later starting point in the reply message is redundant text. In a further embodiment, the data processing system 100 parses the reply message for a match at multiple starting points in both the first and the second directions.

Figure 12:
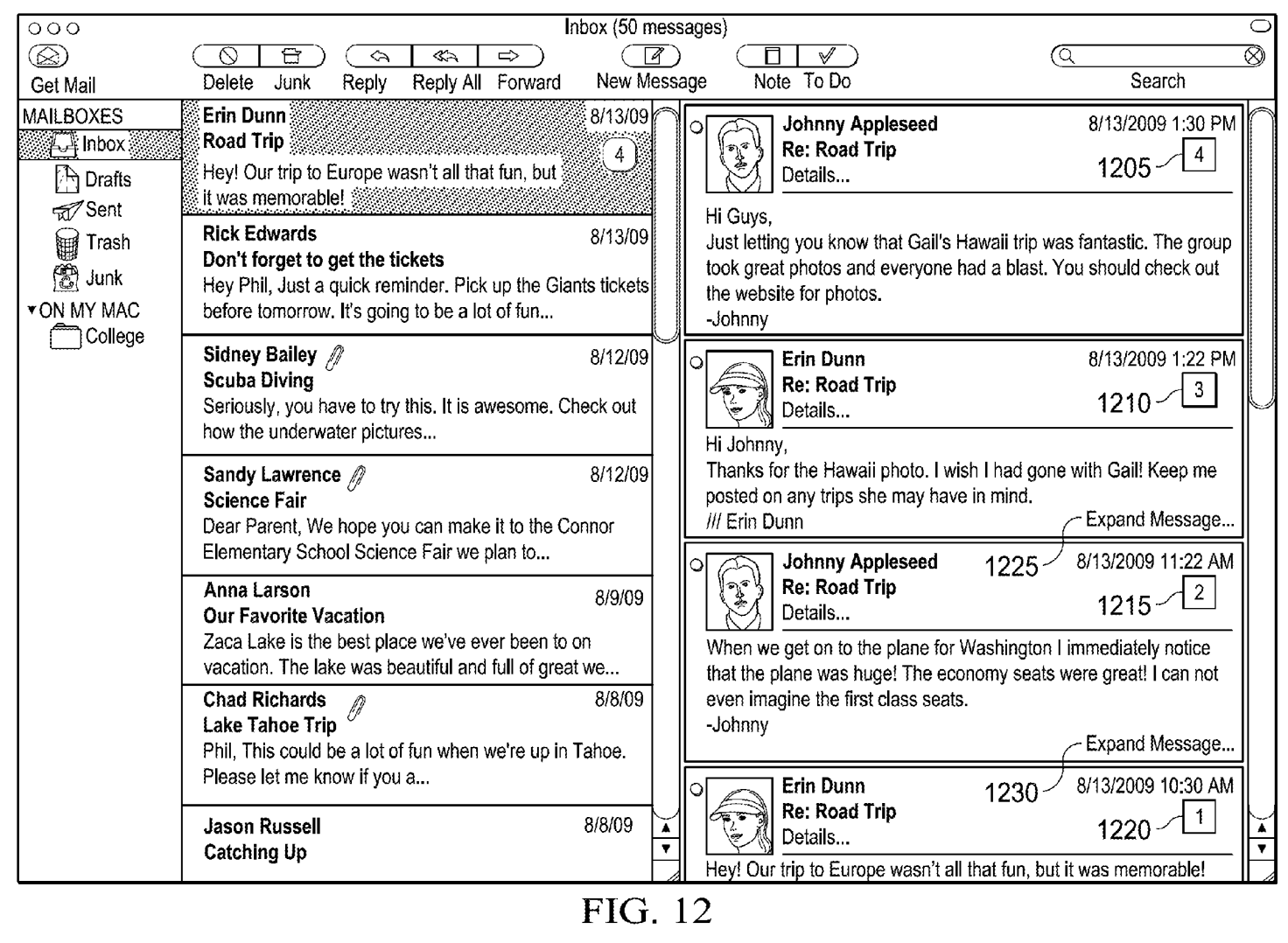

For one embodiment, the data processing system 100 provides the option to expand the message to show hidden text. For example, referring to FIG. 10, message 3 includes "See More from Johnny Appleseed" 1030 and message 2 includes "See More" 1035 in each quote as indicators of hidden redundant text. Referring to FIG. 12, messages 2 and 3 include "Expand Message . . ." 1225 and 1230 in the lower right corner of each message. For one embodiment, a different indicator of hidden text is used. For one embodiment a different location of the indicator is used. For one embodiment, the message is expanded in response to receiving an input from a user. For example, the input received to expand a message may include a mouse click on the indicator, a selection from a drop down menu, a selection made via "right-click" on the message, etc. For one embodiment, the expansion of each instance of hidden text is initiated separately.

Figure 13:
FIG. 13 illustrates the exemplary user interface of FIG. 12 in which a message is being expanded to show hidden text.

FIG. 13 illustrates the exemplary user interface of FIG. 12 in which a message is being expanded to show hidden text. For one embodiment, the expansion of the message has the appearance of a folded letter (e.g., an image of a message on a folded piece of paper) in which the hidden text was under the fold and, by unfolding the letter, the hidden text becomes visible. Alternatively, the message is expanded simply by increasing the length of the message. For one embodiment, as the message expands, any messages in the conversation that are displayed above or below the expanding message are moved or removed from view to accommodate the space needed for the expanded message. For example, for one embodiment, the expansion of message 3 results in messages 1 and 2 being pushed further down screen.

Figure 14:
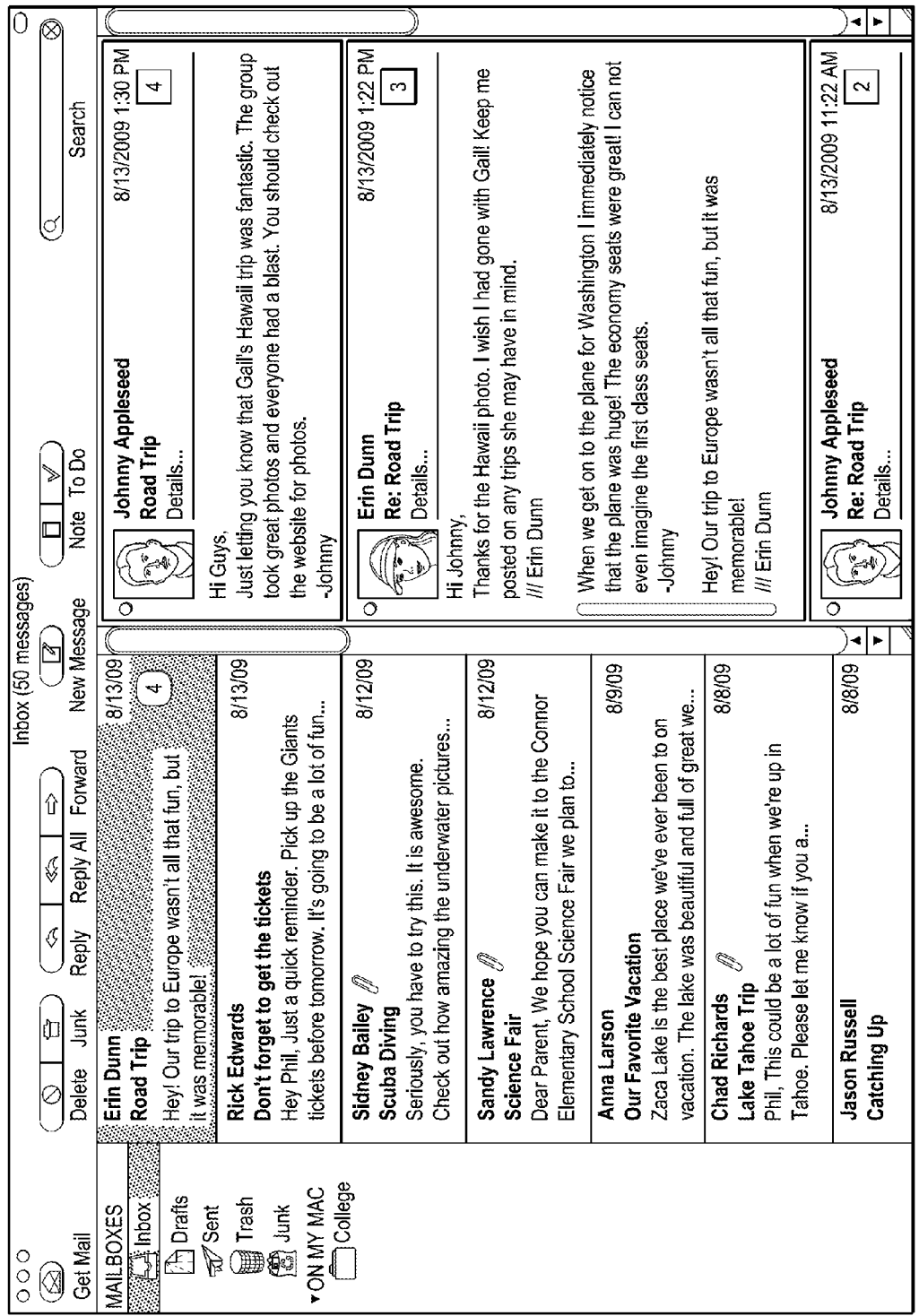
FIG. 14 illustrates the exemplary user interface of FIG. 12 in which a message has been expanded to show hidden text.

FIG. 14 illustrates the exemplary user interface of FIG. 12 in which a message has been expanded to show hidden text. For example, in the exemplary user interface, the redundant text of message 2 is now also visible in message 3.

For one embodiment, the displaying of the received message includes displaying a preview of the received message (e.g., in a preview pane as discussed above with reference to FIG. 4). For one embodiment, the preview includes at least a portion of non-redundant text (e.g., text that does not match the text of the original message). For an alternate embodiment, the preview only includes non-redundant text.

In the foregoing specification, the invention has been described with reference to specific exemplary embodiments thereof. It will be evident that various modifications may be made thereto without departing from the broader spirit and scope of the invention as set forth in the following claims. An article of manufacture may be used to store program code providing at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention. The specification and drawings are, accordingly, to be regarded in an illustrative sense rather than a restrictive sense.

What is claimed is:

1. A computer-implemented method of managing email message grouping comprising:
   determining, by the computer, whether a prefix or a suffix is present in the subject of a received message;
   displaying, by the computer, the received message as the start of a new email message group in response to determining that a prefix or a suffix is not present in the subject of the received message;
   determining, by the computer, whether header information is included in the received message that identifies a message to which the received message is a response;
   determining, by the computer, whether the identified message is a stored message, in response to determining that the received message identifies the message to which the received message is a response;
   displaying, by the computer, the received message as grouped with the identified message, in response to determining that a prefix or a suffix is present in the subject of the received message and in response to determining header information is included in the received message that identifies the message to which the received message is a response, and in response to determining that the identified message is a stored message;
   parsing, by the computer, a stored message for at least a partial match between a subject of the received message and a subject of the stored message, and for at least a partial match between sender and recipient participants of the received message and sender and recipient participants of the stored message; and
   displaying, by the computer, the received message as grouped with the stored message in response to determining that:
   (i) a prefix or a suffix is present in the subject of the received message, and
   (ii) header information is not included in the received message that identifies the message to which the received message is a response, and
   (iii) there is at least a partial match between the subject of the received message and the subject of the stored message, and
   (iv) there is at least a partial match between sender and recipient participants of the received message and sender and recipient participants of the stored message.

2. The computer-implemented method of claim 1, wherein the displaying the received message as grouped with the stored message includes displaying a preview pane listing a plurality of messages, the plurality of messages including the grouped messages displayed as a single preview pane item with an indicator that the single preview pane item represents a group of multiple messages, the method further comprising:
   expanding the single preview pane item, in response to a received input, to further display a selectable preview pane item for each of the grouped messages.

3. The computer-implemented method of claim 2, further comprising:
   receiving an input selecting one of multiple messages in the expanded preview pane item; and
   scrolling a message pane display of the multiple messages to bring a corresponding message view of the selected one of the multiple messages to a predetermined position.

4. The computer-implemented method of claim 1, further comprising:
  displaying a preview pane listing a plurality of messages, wherein at least one of the plurality of messages is displayed as a preview pane item including a stack of overlaid thumbnail images representing a plurality of files attached to the at least one message, wherein the topmost of the stack of images shows the content of one of the plurality of files on top of the stack and the remaining of the overlaid thumbnail images are at least partially obscured; and
  expanding the stacked images, in response to a received input, into a plurality of individual thumbnail images in the preview pane item, each thumbnail image showing the content of a different one of the plurality of files.

5. The computer-implemented method of claim 1, wherein the displaying the received message as grouped with the stored message includes displaying the received message and the stored message in a single window and labeling each of the grouped messages with an indication of the chronological order of messages in the conversation.

6. The computer-implemented method of claim 1 wherein the header information includes a reference header or an in-reply-to header.

7. The computer-implemented method of claim 6, further comprising:
  identifying a second stored message that was processed prior to the received message that includes header information referencing the received message; and
  displaying the received message as grouped with the second stored message.

8. An apparatus comprising:
  a processing device, wherein the processing device executes instructions that cause the processing device to:
    determine that whether a prefix or a suffix is present in the subject of a received message;
    display the received message as the start of a new email message group in response to determining that a prefix or a suffix is not present in the subject of the received message;
    determine whether header information is included in the received message that identifies a message to which the received message is a response;
    determine whether the identified message is a stored message, in response to determining that the received message identifies the message to which the received message is a response;
    display the received message as grouped with the identified message, in response to determining that a prefix or a suffix is present in the subject of the received message and in response to determining that header information is included in the received message that identifies the message to which the received message is a response, and in response to determining that the identified message is a stored message;
    parse, a stored message for at least a partial match between a subject of the received message and a subject of the stored message, and for at least a partial match between sender and recipient participants of the received message and sender and recipient participants of the stored message, and
    display the received message as grouped with the stored message in response to determining that:
      (i) a prefix or a suffix is present in the subject of the received message, and
      (ii) header information is not included in the received message that identifies the message to which the received message is a response, and
      (iii) there is at least a partial match between the subject of the received message and the subject of the stored message, and
      (iv) there is at least a partial match between sender and recipient participants of the received message and sender and recipient participants of the stored message.

9. The apparatus of claim 8, wherein the displaying the received message as grouped with the stored message includes displaying a preview pane listing a plurality of messages, the plurality of messages including the grouped messages displayed as a single preview pane item with an indicator that the single preview pane item represents a group of multiple messages, and wherein the processing device executes instructions that further cause the processing device to:
  expand the single preview pane item, in response to a received input, to further display a selectable preview pane item for each of the grouped messages.

10. The apparatus of claim 8, wherein the processing device executes instructions that further cause the processing device to:
  display a preview pane listing a plurality of messages, wherein at least one of the plurality of messages is displayed as a preview pane item including a thumbnail of stacked images representing a plurality of files attached to the at least one message, wherein the stacked images show the content of one of the plurality of files on top of the stack; and
  expand the stacked images, in response to a received input, into a plurality of individual thumbnail images in the preview pane item, each thumbnail image showing the content of a different one of the plurality of files.

11. The apparatus of claim 8, wherein the displaying the received message as grouped with the stored message includes displaying the received message and the stored message in a single window and labeling each of the grouped messages with an indication of the chronological order of messages in the conversation.

12. The apparatus of claim 8, wherein the header information includes a reference header or an in-reply-to header.

13. A non-transitory machine-readable storage medium storing instructions that, when executed, cause a processing device to perform a method comprising:
  determining whether a prefix or a suffix is present in the subject of a received message;
  displaying the received message as the start of a new email message group in response to determining that a prefix or a suffix is not present in the subject of the received message;
  determining whether header information is included in the received message that identifies a message to which the received message is a response;
  determining whether the identified message is a stored message, in response to determining that the received message identifies the message to which the received message is a response;
  displaying the received message as grouped with the identified message in response to determining that a prefix or a suffix is present in the subject of the received message and in response to determining that header information is included in the received message that identifies the message to which the received message is a response, and in response to determining that the identified message is a stored message;

parsing a stored message for at least a partial match between a subject of the received message and a subject of the stored message, and for at least a partial match between sender and recipient participants of the received message and sender and recipient participants of the stored message; and displaying the received message as grouped with the stored message in response to determining that:
(i) a prefix or a suffix is present in the subject of the received message, and
(ii) header information is not included in the received message that identifies the message to which the received message is a response, and
(iii) there is at least a partial match between the subject of the received message and the subject of the stored message, and
(iv) there is at least a partial match between sender and recipient participants of the received message and sender and recipient participants of the stored message.

14. The non-transitory machine-readable storage medium of claim 13, wherein the displaying the received message as grouped with the stored message includes displaying a preview pane listing a plurality of messages, the plurality of messages including the grouped messages displayed as a single preview pane item with an indicator that the single preview pane item represents a group of multiple messages, and wherein the instructions, when executed, cause the processing device to perform a method further comprising:
expanding the single preview pane item, in response to a received input, to further display a selectable preview pane item for each of the grouped messages.

15. The non-transitory machine-readable storage medium of claim 13, wherein the instructions, when executed, cause the processing device to perform a method further comprising:
displaying a preview pane listing a plurality of messages, wherein at least one of the plurality of messages is displayed as a preview pane item including a stack of overlaid thumbnail images representing a plurality of files attached to the at least one message, wherein the topmost of the stacked images shows the content of one of the plurality of files on top of the stack and the remaining of the overlaid thumbnail images are at least partially obscured; and
expanding the stacked images, in response to a received input, into a plurality of individual thumbnail images in the preview pane item, each thumbnail image showing the content of a different one of the plurality of files.

16. The non-transitory machine-readable storage medium of claim 13, wherein the displaying the received message as grouped with the stored message includes displaying the received message and the stored message in a single window and labeling each of the grouped messages with an indication of the chronological order of messages in the conversation.

17. The non-transitory machine-readable storage medium of claim 13, wherein the header information includes a reference header or an in-reply-to header.

18. A computer-implemented method of reducing redundant message text comprising:
receiving, by the computer, a reply message containing content of an original message, wherein the reply message comprises a subject including a prefix or a suffix and header information indicating that the reply message is a reply to another message;

parsing, by the computer, text of the reply message for text of the original message, wherein the parsing includes comparing the text of the reply message and the text of the original message character by character until reaching a non-matching character;

determining, by the computer, that a minimum threshold of consecutive matching characters has been reached; and displaying, by the computer, the reply message with the consecutive matching characters at least partially hidden from view in response to determining that the minimum threshold of consecutive matching characters has been reached.

19. The computer-implemented method of claim 18, wherein a portion of the consecutive matching characters are displayed.

20. The computer-implemented method of claim 18, wherein all of the consecutive matching characters are hidden when the reply message is displayed.

21. The computer-implemented method of claim 18, further comprising:
identifying an attribute automatically added to the reply message above a block of matching characters and hiding the attribute when the reply message is displayed.

22. The computer-implemented method of claim 18, wherein the parsing further includes resuming searching for matching characters after reaching the non-matching character if the original message still contains additional content to be matched.

23. The computer-implemented method of claim 22, wherein the at least partially hidden characters are two consecutive blocks of characters separated by non-matching text.

24. The computer-implemented method of claim 18, wherein the parsing is initially performed from the beginning of the reply message towards the end of the reply message, and further comprising:
determining that not all of the original text has been matched; and
parsing the text of the reply message for the text of the original message from the end of the reply message towards the beginning of the reply message.

25. The computer-implemented method of claim 18, further comprising:
expanding the message, in response to a received input, to display the hidden characters, the expanding including displaying the message as an unfolding letter wherein the hidden characters were hidden under a folded portion of the letter.

26. The computer-implemented method of claim 18, wherein the displaying the received message includes displaying a preview of the received message, the preview including at least a portion of text that does not match the text of the original message.

27. An apparatus comprising:
a processing device, wherein the processor executes instructions that cause the processor to
receive a reply message containing content of an original message, wherein the reply message comprises a subject including a prefix or a suffix and header information indicating that the reply message is a reply to another message;
parse text of the reply message for text of the original message, wherein the parsing includes comparing the text of the reply message and the text of the original message character by character until reaching a non-matching character;

determine that a minimum threshold of consecutive matching characters has been reached; and display the reply message with the consecutive matching characters at least partially hidden from view in response to determining that the minimum threshold of consecutive matching characters has been reached.

28. The apparatus of claim 27, wherein a portion of the consecutive matching characters are displayed.

29. The apparatus of claim 27, wherein all of the consecutive matching characters are hidden when the reply message is displayed.

30. The apparatus of claim 27, wherein the instructions further cause the processor to identify an attribute automatically added to the reply message above a block of matching characters and hiding the attribute when the reply message is displayed.

31. The apparatus of claim 27, wherein the parsing further includes resuming searching for matching characters after reaching the non-matching character if the original message still contains additional content to be matched.

32. The apparatus of claim 31, wherein the at least partially hidden characters are two consecutive blocks of characters separated by non-matching text.

33. The apparatus of claim 27, wherein the parsing is initially performed from the beginning of the reply message towards the end of the reply message, and wherein the instructions further cause the processor to:

determine that not all of the original text has been matched; and parse the text of the reply message for the text of the original message from the end of the reply message towards the beginning of the reply message.

34. The apparatus of claim 27, wherein the instructions further cause the processor to:

expand the message, in response to a received input, to display the hidden characters, the expanding including displaying the message as an unfolding letter wherein the hidden characters were hidden under a folded portion of the letter.

35. The apparatus of claim 27, wherein the displaying of the received message includes displaying a preview of the received message, the preview including at least a portion of text that does not match the text of the original message.

36. A non-transitory machine-readable storage medium storing instructions that, when executed, cause a processing device to perform a method comprising:

receiving a reply message containing content of an original message, wherein the reply message comprises a subject including a prefix or a suffix and header information indicating that the reply message is a reply to another message;

parsing text of the reply message for text of the original message, wherein the parsing includes comparing the text of the reply message and the text of the original message character by character until reaching a non-matching character;

determining that a minimum threshold of consecutive matching characters has been reached; and displaying the reply message with the consecutive matching characters at least partially hidden from view in response to determining that the minimum threshold of consecutive matching characters has been reached.

37. The non-transitory machine-readable storage medium of claim 36, wherein a portion of the consecutive matching characters are displayed.

38. The non-transitory machine-readable storage medium of claim 36, wherein all of the consecutive matching characters are hidden when the reply message is displayed.

39. The non-transitory machine-readable storage medium of claim 36, wherein the instructions, when executed, cause the processing device to perform a method further comprising:

identifying an attribute automatically added to the reply message above a block of matching characters and hiding the attribute when the reply message is displayed.

40. The non-transitory machine-readable storage medium of claim 36, wherein the parsing further includes resuming searching for matching characters after reaching the non-matching character if the original message still contains additional content to be matched.

41. The non-transitory machine-readable storage medium of claim 40, wherein the at least partially hidden characters are two consecutive blocks of characters separated by non-matching text.

42. The non-transitory machine-readable storage medium of claim 36, wherein the parsing is initially performed from the beginning of the reply message towards the end of the reply message, and wherein the instructions, when executed, cause the processing device to perform a method further comprising:

determining that not all of the original text has been matched; and parsing the text of the reply message for the text of the original message from the end of the reply message towards the beginning of the reply message.

43. The non-transitory machine-readable storage medium of claim 36, wherein the instructions, when executed, cause the processing device to perform a method further comprising:

expanding the message, in response to a received input, to display the hidden characters, the expanding including displaying the message as an unfolding letter wherein the hidden characters were hidden under a folded portion of the letter.

44. The non-transitory machine-readable storage medium of claim 36, wherein the displaying of the received message includes displaying a preview of the received message, the preview including at least a portion of text that does not match the text of the original message.

45. The method of claim 1, further comprising:

receiving, by the computer, the identified message, subsequent to the determining that the identified message had not been stored;

storing the identified message; and displaying the received message as grouped with the identified message.

46. The method of claim 2, wherein the displayed preview pane item for each of the grouped messages comprises text that is responsive to one or more messages within the grouped messages.

47. The method of claim 46, wherein the displayed expanded preview pane item for each of the grouped messages comprises text that substantially excludes text of other messages within the grouped messages.

48. The method of claim 47, further comprising:

selecting a message from the grouped messages in the preview pane; and displaying the selected message in the expanded preview pane, wherein displaying the selected message comprises displaying the message text that substantially comprises a responsive portion of the message and substantially excludes message text that is duplicative of other messages within the grouped messages.

* * * * *